United States Patent
Eom et al.

(10) Patent No.: US 9,659,092 B2
(45) Date of Patent: May 23, 2017

(54) MUSIC INFORMATION SEARCHING METHOD AND APPARATUS THEREOF

(71) Applicants: SAMSUNG ELECTRONICS CO., LTD., Suwon-si (KR); KWANGWOON UNIVERSITY INDUSTRY-ACADEMIC COLLABORATION FOUNDATION, Seoul (KR)

(72) Inventors: Ki-wan Eom, Hwaseong-si (KR); Hyoung-Gook Kim, Seoul (KR); Kwang-ki Kim, Daejeon (KR)

(73) Assignees: SAMSUNG ELECTRONICS CO., LTD., Suwon-si (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 457 days.

(21) Appl. No.: 14/078,883

(22) Filed: Nov. 13, 2013

(65) Prior Publication Data

US 2014/0135964 A1     May 15, 2014

Related U.S. Application Data

(60) Provisional application No. 61/725,666, filed on Nov. 13, 2012.

(30) Foreign Application Priority Data

Jul. 12, 2013    (KR) ........................ 10-2013-0082245

(51) Int. Cl.
*G06F 17/00*      (2006.01)
*G06F 17/30*      (2006.01)

(52) U.S. Cl.
CPC .............................. *G06F 17/30743* (2013.01)

(58) Field of Classification Search
CPC ................................................. G06F 17/30743
(Continued)

(56) References Cited

U.S. PATENT DOCUMENTS 6,434,520 B1 *   8/2002   Kanevsky ......... G06F 17/30746
                                                            704/243
7,627,477 B2 *   12/2009   Wang ................. G06K 9/00536
                                                            341/110

(Continued)

FOREIGN PATENT DOCUMENTS

| EP | 1 768 102 A1 | 3/2007 |
|---|---|---|
| WO | 02/11123 A2 | 2/2002 |
| WO | 2012/120531 A2 | 9/2012 |

OTHER PUBLICATIONS

Communication dated Feb. 10, 2014 issued by the European Patent Office in counterpart European Application No. 13190128.2.

*Primary Examiner* — Hemant Patel
(74) *Attorney, Agent, or Firm* — Sughrue Mion, PLLC

(57) ABSTRACT

A music information searching method includes extracting modulating spectrums from audio data, generating modulating spectrum peak point audio fingerprints by using position information which relates to preset peak points from the extracted modulating spectrums, converting the generated modulating spectrum peak point audio fingerprints into hash keys which indicate addresses of hash tables and hash values that are stored on the hash tables via hash functions, and searching music information by extracting hash keys which relate to audio query clips and comparing the extracted hash keys with the indicated addresses of the hash tables.

18 Claims, 8 Drawing Sheets

(58) Field of Classification Search
USPC .............. 379/67.1–88.28; 455/412.1–426.1; 700/94; 704/270–278
See application file for complete search history.

(56) References Cited

U.S. PATENT DOCUMENTS

| | | | | |
|---|---|---|---|---|
| 7,818,167 | B2* | 10/2010 | Kim .................. | G06F 17/30743 704/200.1 |
| 2003/0191764 | A1* | 10/2003 | Richards ........... | G06F 17/30758 |
| 2006/0190450 | A1* | 8/2006 | Holm ................ | G06F 17/30743 |
| 2011/0173185 | A1* | 7/2011 | Vogel ................ | G06F 17/30038 707/722 |

* cited by examiner

100

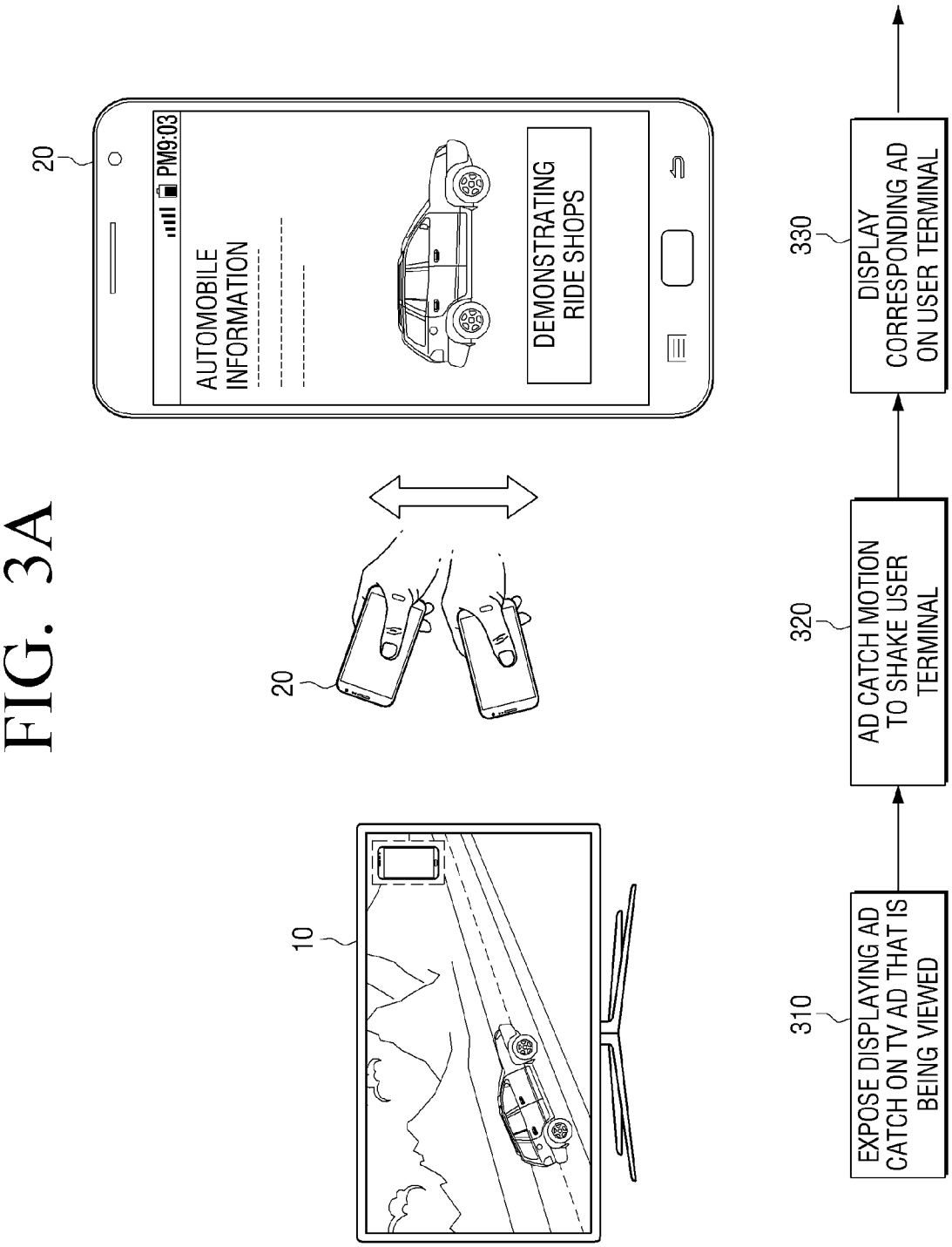

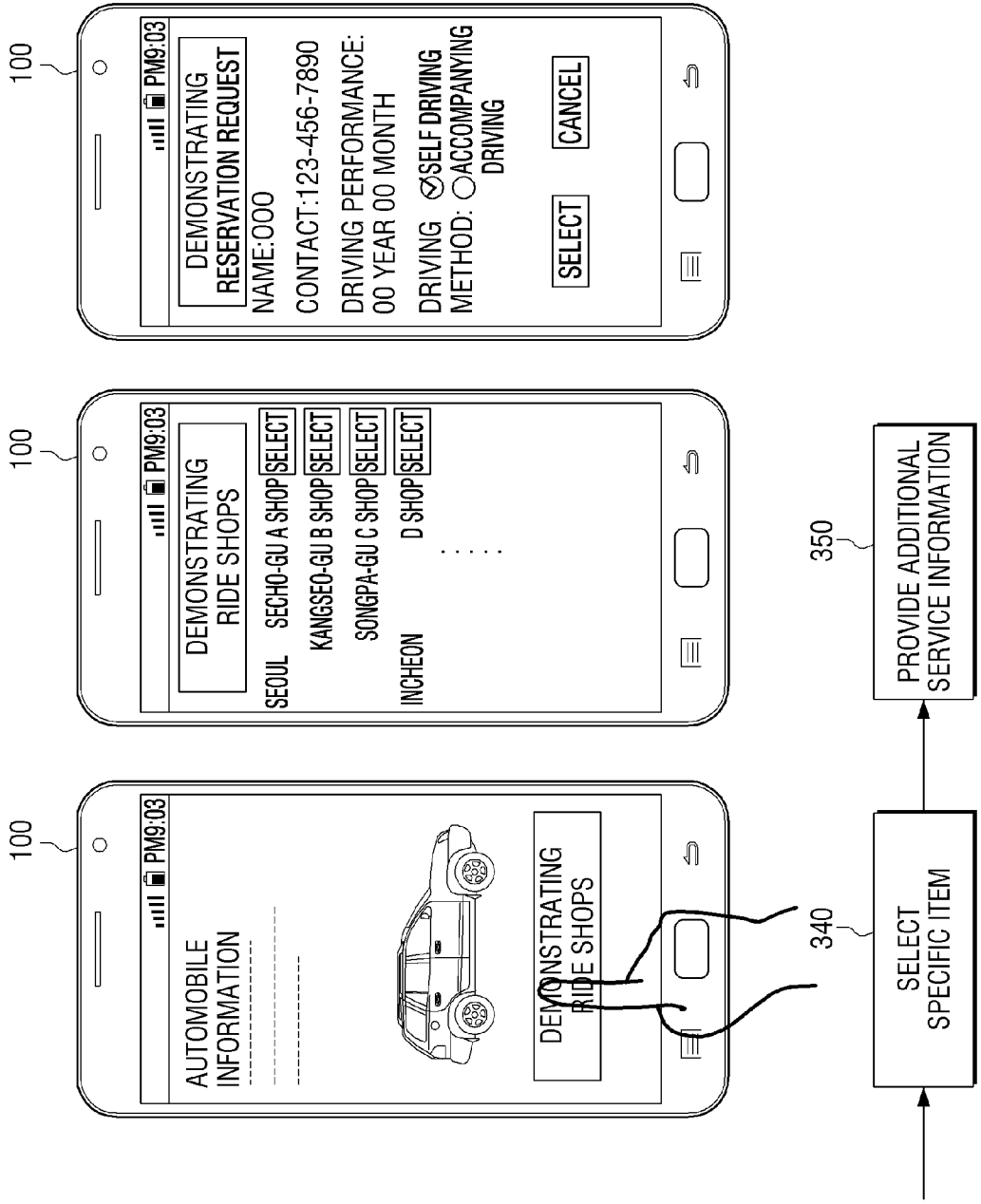

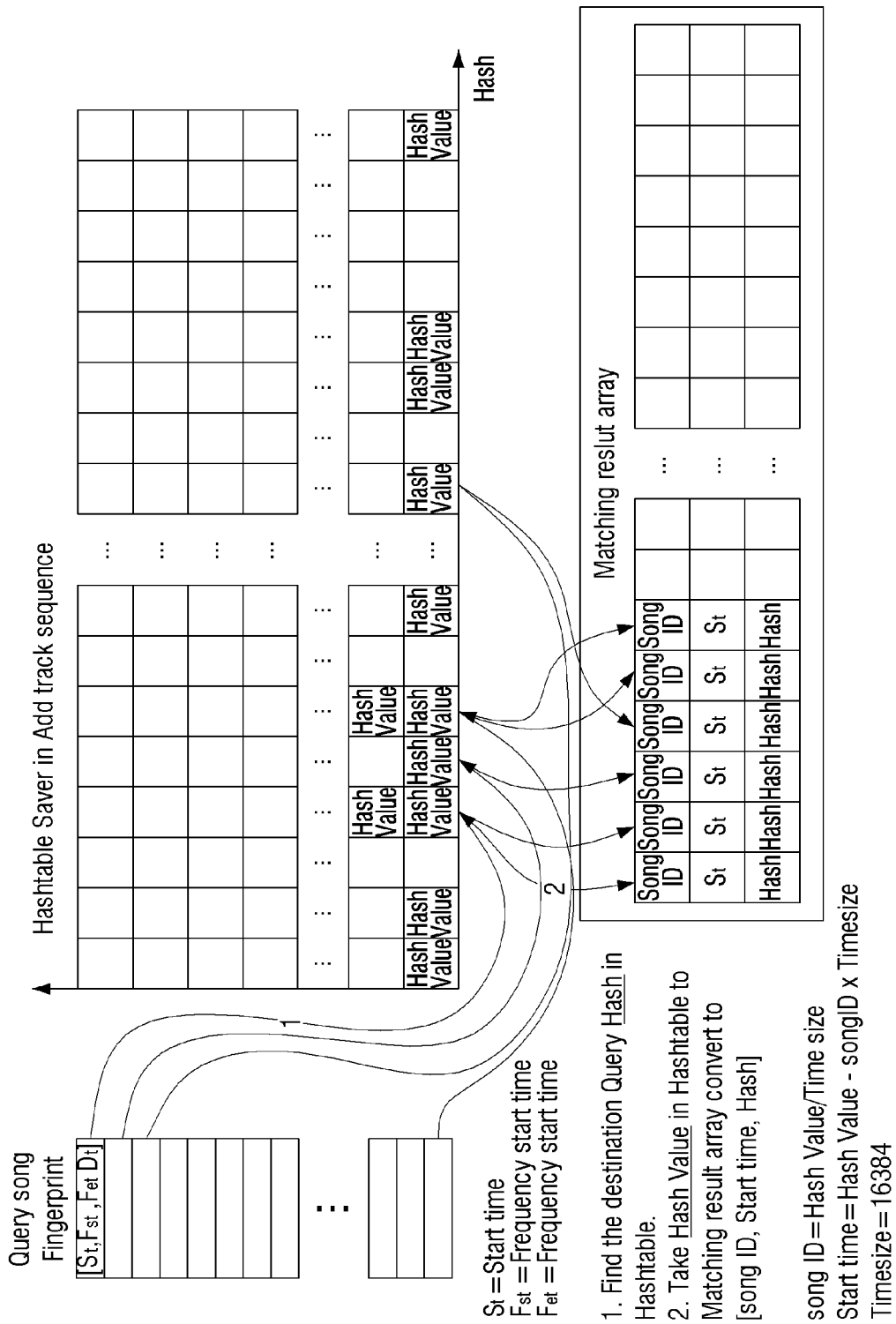

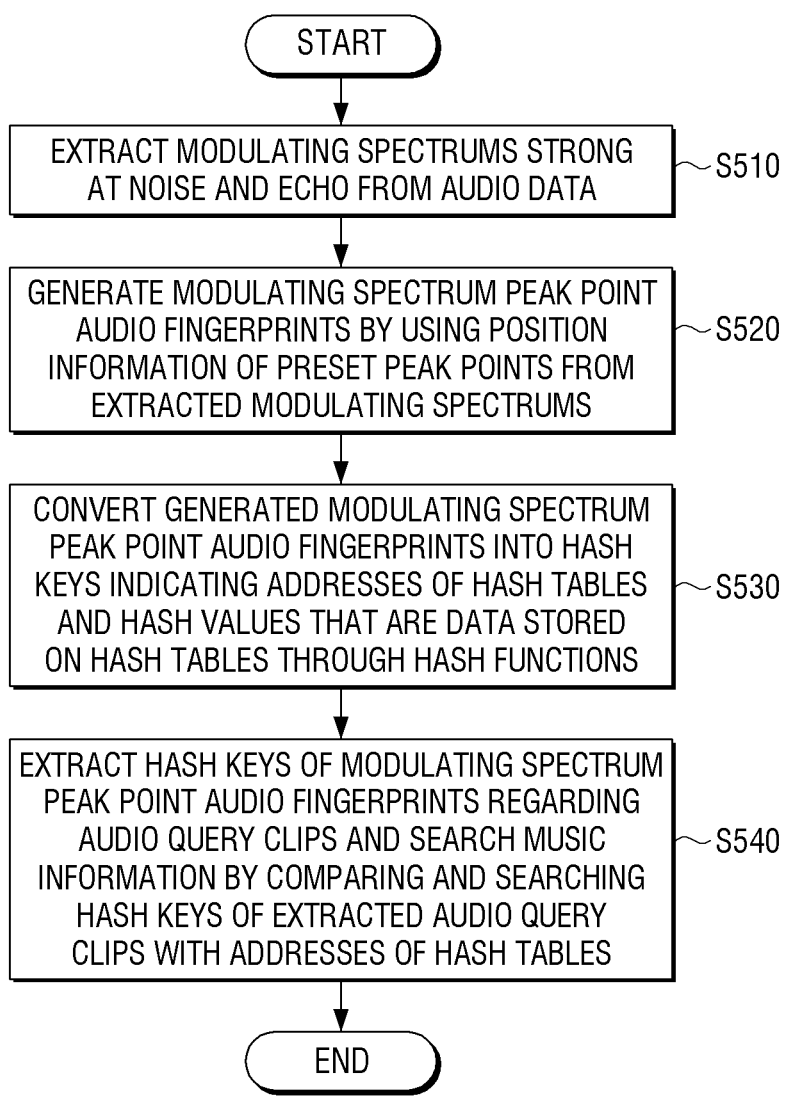

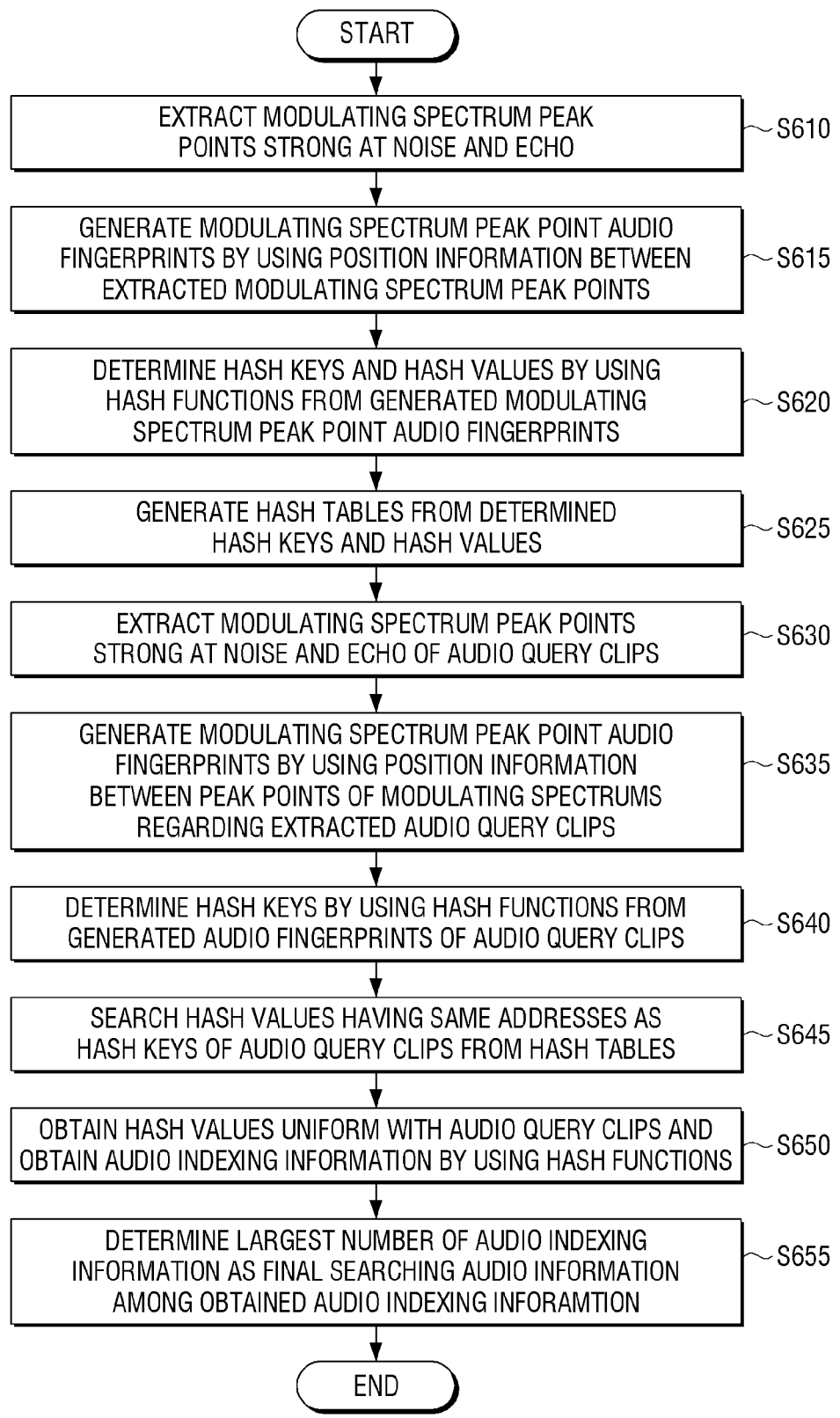

MUSIC INFORMATION SEARCHING METHOD AND APPARATUS THEREOF

CROSS-REFERENCE TO RELATED APPLICATIONS

This application claims the benefit of U.S. Provisional Patent Application No. 61/725,666, filed on Nov. 13, 2012 in the United States Patent and Trademark Office, and priority from Korean Patent Application No. 10-2013-0082245, filed on Jul. 12, 2013 in the Korean Intellectual Property Office, the disclosures of which are incorporated herein by reference in their entireties.

BACKGROUND

1. Field

Methods and apparatuses consistent with what is disclosed herein relate to a music information searching method and an apparatus thereof, and more particularly, to a music information searching method using a modulating spectrum and an apparatus thereof.

2. Description of the Related Art

Related music information searching methods extract features for searching audio by using a power spectrum which is generated as a result of converting audio signals into frequency domain with the fast Fourier transform (FFT). Thus, problems occur because the methods are not robust against various noise environments.

Further, related music information searching methods often require an excessive amount of time to search music songs by matching a query of a user with data residing in a large database by using statistical methods, such as the Gaussian mixture model (GMM) and the hidden Markov model (HMM), and therefore, the methods cannot provide the searching information within a short time.

Further, in related methods which entail searching music information by building the audio fingerprint system, used features do not show strong performance with respect to noise environments. Thus, performance may deteriorate when obtaining music information by using music data which is generated from real environments such as streets, etc.

Further, related music information searching methods use the strong spectrum flatness and the spectral crest measure; however, these features are also weak with respect to various noise environments. The methods also use the vector quantization method (VQ) or the statistical nearest neighbor method (SNN) for audio fingerprint indexing, and thus, they may have lower operation of searching information with respect to various noise environments.

Further, related music searching information methods have a problem in that searching is quite slow due to use of the nearest neighbor classification method after modulating spectrums are extracted by using wave converting in a structure which implements various processes.

Therefore, a new method is necessary, which shows strong performance with respect to noise environments and which searches music information at high speed.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to an exemplary embodiment, a technical objective is to provide a method for searching music information with respect to noise environments with high speed by extracting modulating spectrums which are relatively strong with respect to noise environments, converting position information which relates to modulating spectrum peak points that are clearly distinguishable from among the extracted modulating spectrums into hash addresses and hash values, and using hash tables, and an apparatus thereof.

According to an exemplary embodiment, another technical objective is to provide a method for searching music information via a hash searching method which uses modulating spectrum peak points or modulating spectrum peak point positions according to modulating spectrum features which are relatively strong with respect to noise environments, and an apparatus thereof.

According to an exemplary embodiment, a music information searching method is provided, which may include extracting modulating spectrums from audio data, generating modulating spectrum peak point audio fingerprints by using position information which relates to preset peak points from the extracted modulating spectrums, converting the generated modulating spectrum peak point audio fingerprints into hash keys which indicate addresses of hash tables and hash values that are stored on the hash tables via at least one hash function, and extracting hash keys which relate to audio query clips, and searching music information by comparing the extracted hash keys with the indicated addresses of the hash tables.

According to an exemplary embodiment, a music information searching method is provided, which may include extracting modulating spectrums from audio data, normalizing, via a modulating spectrum normalization process, the extracted modulating spectrums in order to delete overlapping with unnecessary areas that do not indicate unique features of audio signals from the extracted modulating spectrums, distinguishing position information which relates to first modulating spectrum peak points which are weaker than a first threshold with respect to noisy environments from second modulating spectrum peak points which are stronger than the first threshold with respect to the noisy environments, and extracting the second modulating spectrum peak points, converting position information which relates to the extracted second modulating spectrum peak points into modulating spectrum peak point audio fingerprints, converting, by using at least one hash function, identification numbers which are respectively allocated to the modulating spectrum peak point audio fingerprints and music songs into hash keys that indicate addresses of hash tables and hash values that are stored on the hash tables, and storing a result of the converting on the hash tables, extracting modulating spectrums from audio query clips, normalizing, via the modulating spectrum normalization process, the extracted audio query modulating spectrums in order to delete overlapping with unnecessary areas that do not indicate unique features of audio query signals from the extracted audio query modulating spectrums, distinguishing position information which relates to first audio query modulating spectrum peak points which are weaker than a second threshold with respect to the noisy environments from second audio query modulating spectrum peak points which are stronger than the second threshold with respect to the noisy environments from among the normalized audio query modulating spectrums, and extracting the second audio query modulating spectrum peak points, converting position information which relates to the extracted second audio query modulating spectrum peak points into audio fingerprints which relate to the second audio query modulating spectrum peak points, extracting position information which relates to the second audio query modulating spectrum peak points from among the extracted modulating spectrums of audio query clips, converting position information which relates to the second extracted modulating spectrum peak points into modulating spectrum peak point audio fingerprints, obtaining hash values of hash tables which respectively correspond to the addresses by calculating, by using at least one hash function, hash keys from the extracted modulating spectrum peak point audio fingerprints of audio query clips, and determining final searching results by obtaining audio indexing information from the obtained hash values.

The extracting the modulating spectrums from the audio data may include extracting spectrum coefficients of the audio data by performing a fast Fourier transform (FFT), and converting the extracted spectrum coefficients into modulating spectrums via at least one modulating function.

The normalizing the modulating spectrums may include using at least one normalizing method from among a Zero-Mean normalization, a Cepstral Mean normalization, a Decibel-scale normalization, a normalization by using average values, a normalization by using medium values, and a Quantile normalization.

The extracting the modulating spectrum peak points may include using at least one from among a finite impulse response filter, an infinite impulse response filter, a Kalman filter, a spectrum deduction, a method for calculating minimum components of modulating spectrums and calculating modulating spectrum peak points by using the calculated minimum components, a method for extracting distinguished peak points from noise components by using adaptive threshold values which are calculable by using a highest peak point of the modulating spectrums, and a method for deleting noises by using a zero crossing rate and energy.

The converting into the audio query modulating spectrum peak point audio fingerprints may include obtaining position information which exists within preset intervals between the distinguished second modulating spectrum peak points by using values which indicate positions of the extracted second modulating spectrum peak points as modulating spectrum peak point audio fingerprints.

The storing on the hash tables may include calculating hash keys which indicate respective addresses of the hash tables and hash values which relate to the hash tables by using information which relates to the generated modulating spectrum peak point audio fingerprints via at least one hash function, and generating the hash tables by storing the modulating spectrum peak point audio fingerprints on the hash tables based on the calculated hash keys and hash values.

The extracting the modulating spectrums from the audio query clips may include extracting spectrum coefficients by performing a respective FFT of each of the audio data and the audio query clip data, and converting the extracted spectrum coefficients into the modulating spectrums via at least one modulating function.

The extracting the position information which relates to the second audio query modulating spectrum peak points from among the extracted modulating spectrums of audio query clips may include using at least one from among a finite impulse response filter, an infinite impulse response filter, a Kalman filter, a spectrum deduction, a method for calculating minimum components of modulating spectrums and calculating modulating spectrum peak points by using the calculated minimum components, a method for extracting distinguished peak points from noise components by using adaptive threshold values which are calculable by using a highest peak point of the modulating spectrums, and a method for deleting noises by using a zero crossing rate and energy.

The converting into the modulating spectrum peak point audio fingerprints may include obtaining position information which relates to two points by using values which indicate positions of the extracted modulating spectrum peak points as modulating spectrum peak point audio fingerprints.

The obtaining the hash values of the hash tables may include obtaining hash keys which indicate respective addresses of the hash tables by using information which relates to the generated modulating spectrum peak point audio fingerprints of audio query clips via at least one hash function, and obtaining the hash values by using the obtained hash keys.

The determining the final searching results may include converting the hash values into audio indexing information by using the at least one hash function, and determining a maximum amount of audio indexing information as final searching audio information from among the obtained audio indexing information.

According to one or more of the above various exemplary embodiments, the method for searching music information with high speed with respect to noise environments and the apparatus thereof can be provided, by extracting modulating spectrums which are relatively strong with respect to the noise environments, converting position information which relates to distinguished modulating spectrum peak points with respect to the extracted modulating spectrums into hash addresses and hash values, and using hash tables.

Further, according to one or more exemplary embodiments, music songs which match the provided query clips can be searched with high speed from great amount of music by using the hash searching method without using the related statistical classifying method.

Further, according to one or more exemplary embodiments, modulating differences of related low dimensional spectrum energy are extracted and stored to function as audio fingerprints in high dimensional binary bits, and low dimensional audio fingerprints are extracted and applied to the hash searching method without the method for using the hash searching being based on bit error rate (BER). Therefore, music songs matching the provided query clips can be searched with high speed from great amount of music.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIGS. 3A, 3B, 4A, and 4B are views which illustrate a service providing method, according to an exemplary embodiment;

FIG. 5 is a flowchart which illustrates a music information searching method, according to an exemplary embodiment; and FIG. 6 is a flowchart which illustrates the music information searching method, according to another exemplary embodiment.

DETAILED DESCRIPTION OF EXEMPLARY EMBODIMENTS

Figure 1:
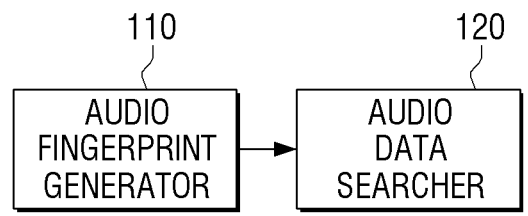
FIG. 1 is a block diagram of a music information searching apparatus, according to an exemplary embodiment.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the present disclosure with unnecessary detail.

FIG. 1 is a block diagram of a music information searching apparatus, according to an exemplary embodiment.

Referring to FIG. 1, the music information searching apparatus 100 includes a modulating spectrum audio fingerprint generator 110 and an audio data searcher 120.

The audio fingerprint generator 110 generates audio fingerprints from at least one of audio data and audio signals ("audio data").

In particular, the audio fingerprint generator 110 extracts modulating spectrums which are relatively strong with respect to noise and/or echo from audio data, and generates audio fingerprints of modulating spectrum peak points by using position information which relates to preset peak points from the extracted modulating spectrums.

The audio data searcher 120 searches corresponding music information by using the audio fingerprints generated in the audio fingerprint generator 110.

In particular, the audio data searcher 120 converts the generated audio fingerprints of modulating spectrum peak points into hash keys which indicate respective addresses of hash tables and hash values which are stored on the hash tables via one or more hash functions.

Further, the audio data searcher 120 extracts hash keys of modulating spectrum peak point audio fingerprints which relate to audio query clips, and searches music information by comparing the extracted hash keys with the addresses of the hash tables. The following will describe an exemplary embodiment by referring to a detailed block diagram.

Figure 2:
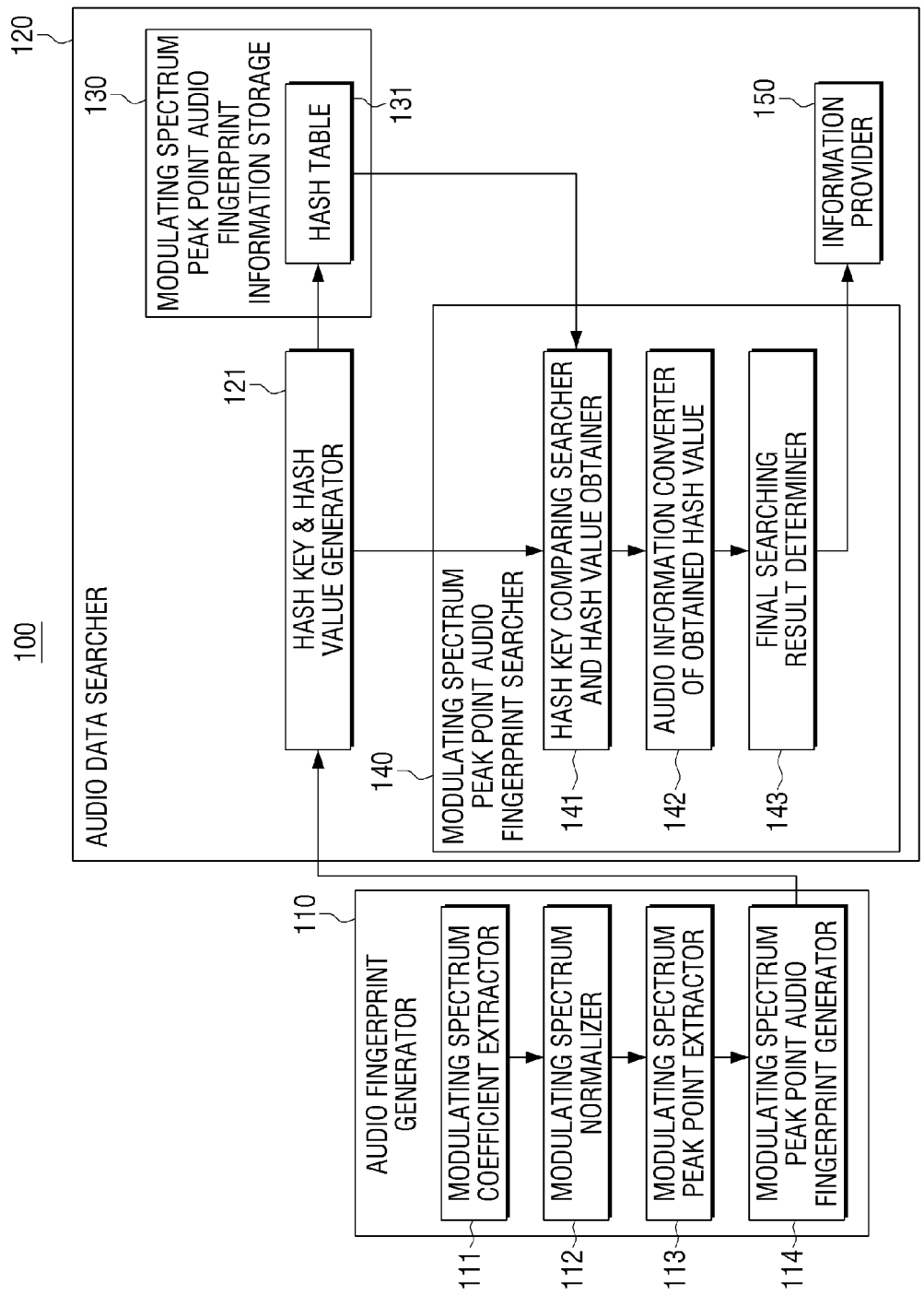
FIG. 2 is a detailed block diagram of the music information searching apparatus illustrated in FIG. 1.

FIG. 2 is a detailed block diagram of the music information searching apparatus illustrated in FIG. 1.

Referring to FIG. 2, the music information searching apparatus 100 according to an exemplary embodiment includes the audio fingerprint generator 110 and the audio data searcher 120.

The audio fingerprint generator 110 extracts modulating spectrums from at least one of audio data and audio signals, and generates audio fingerprints of modulating spectrum peak points by extracting position information which relates to modulating spectrum peak points which are relatively strong with respect to noise and/or echo environments from the extracted modulating spectrums.

In particular, the audio fingerprint generator 110 includes a modulating spectrum coefficient extractor 111, a modulating spectrum normalizer 112, a modulating spectrum peak point extractor 113 which is configured to extract modulating spectrum peak points which are relatively strong with respect to noise and/or echo environments, and an audio fingerprint generator 114 which is configured to use the extracted modulating spectrum peak points.

The modulating spectrum coefficient extractor 111 extracts coefficients of spectrums which are obtained via a performance of a fast Fourier transform (FFT) upon audio data, and converts the extracted spectrum coefficients into modulating spectrums by using at least one modulating function. In components or coefficients of modulating spectrums, various peak points that do not correspond with Fourier transform spectrum coefficients and not distorted in noise or eco environments are generated by using specific modulating functions. Herein, modulating functions which may be used for generating modulating spectrums may include any one or more of a sine function, a cosine function, a complex rotation function using the sine function and the cosine function, a Fourier transform, a wavelet transform, and a Z transform.

The modulating spectrum normalizer 112 deletes overlapped components and dependent components from among the extracted modulating spectrum coefficients in the modulating spectrum coefficient extractor 111, and obtains various modulating spectrum peak points which respectively indicate unique features of the inputted audio signals. In particular, among the audio signals, spectrums which relate to audio signals and music signals corresponding to events have a relatively large amount of energy at relatively low frequencies and less energy at relatively high frequencies. Further, when moving away from music sources, low sounds may not be heard. The overlapped components and dependent components in the modulating spectrum coefficients show an energy distribution at the low frequencies and do not include peak points which are distinguished compared to other audio signals. Thus, overlapping with unnecessary areas which do not show features of audio signals are deleted by performing a normalization of the modulating spectrums, and fast extracting paths regarding peak points indicating unique features of audio signals are provided.

Regarding normalization of the modulating spectrums, any one or more of various normalization methods, such as Zero-Mean normalization, Cepstral Mean normalization, Decibel-scale normalization, normalization using average values, normalization using medium values, and Quantile normalization may be used.

The modulating spectrum peak point extractor 113 distinguishes modulating spectrum peak points which are relatively weak with respect to noise and/or echo components from modulating spectrum peak points which are relatively strong with respect to noise and/or eco components from among the normalized modulating spectrums which are generated via the modulating spectrum normalizer 112, and extracts distinguished modulating spectrum peak points which are relatively strong with respect to noise and/or echo components. For example, the modulating spectrum peak point extractor may use a threshold value to distinguish the relatively strong peak points from the relatively weak peak points.

The modulating spectrum peak point extractor 113 may apply a noise removing filter so as to extract distinguished modulating spectrum peak points which are relatively strong with respect to noise and/or echo components. Further, the modulating spectrum peak point extractor 113 may distinguish peak points which are relatively strong with respect to noise and/or eco components from peak points which are relatively weak with respect to noise and eco components by assuming noise and/or echo components. In this case, the modulating spectrum peak point extractor 113 may perform an extraction of modulating spectrum peak points by using at least one from among a finite impulse response (FIR) filter, an infinite impulse response filter (IIR), a Kalman filter, a Wiener filter, a spectrum deducting method, a method for calculating minimum components of the modulating spectrums and calculating modulating spectrum peak points by using the calculated minimum components, a method for extracting peak points which are distinguished from noise and echo components by using adaptive threshold values which are calculable by using the highest peak point of the modulating spectrums, and a method for extracting peak points by using a zero crossing rate and energy.

The modulating spectrum peak point audio fingerprint generator 114 generates audio fingerprints of modulating spectrum peak points by extracting information which relates to positions of modulating spectrum peak points which are relatively strong with respect to noise and/or echo environments.

In real environments where noises and echo occur, it is important to hear each sound clearly and easily at each frequency while low sounds are not quietly heard when moving away from music sources of audio signals. Further, low sounds are easy to mask by using high sounds; however, high sounds are difficult to mask by using low sounds. In particular, when music signals are analyzed, back sounds including basic frequency sounds are shown as peak points or peaks on the spectrums. Thus, the easiest method to find basic frequency is to find the largest value on spectrum. When analyzing the spectrums, positions and intervals between a frequency value having the largest peak point, distinguished peak points, and other peak points placed around the foregoing peak points have important features to define characteristics of audio signals, specifically, sounds. Information which relates to positions of modulating spectrum peak points extracted by considering the above features of audio signals indicates main components showing audio features that are not distorted by noise and echo environments in the audio signals. Information which relates to distances between positions of the extracted modulating spectrum distinguished peak points and other peak points have features that are relatively strong with respect to noise and echo environments while not being almost damaged by the noise and echo environments. Thus, information which relates to distances between the extracted modulating spectrum peak points may properly be used as hash addresses and hash values, because of the correlation with unique features of audio signals.

The modulating spectrum peak point audio fingerprint generator 114 generates modulating spectrum peak point audio fingerprints by correlating position information which relates to the extracted modulating spectrum peak points. The modulating spectrum peak point audio fingerprints are constituted with values that can indicate positions of the extracted modulating spectrum peak points. Thus, the generator 114 correlates a frame number of one modulating spectrum peak point, a frequency index of one modulating spectrum peak point, a frequency index of the connected other modulating spectrum peak point, and a frame distance between one modulating spectrum peak point and the other modulating spectrum peak point.

The music information searching apparatus, according to an exemplary embodiment, may reduce a size of modulating spectrum peak point fingerprints, and convert the result into fingerprints that are relatively stronger with respect noise and echo environments by generating modulating spectrum peak point audio fingerprints according to the above methods. Thus, the music information searching apparatus may search the provided query clips by using hash tables with high speed.

The audio data searcher 120 searches audio data which corresponds to the modulating spectrum peak point fingerprints generated in the audio fingerprint generator 114, and provides information which relates to the searched audio data to a user. The audio data searcher 120 includes a modulating spectrum peak point audio fingerprint information storage 130, a modulating spectrum peak point audio fingerprint searcher 140, and an information provider 150.

The modulating spectrum peak point audio fingerprint information storage 130 includes the hash table 131.

The hash table 131 is area which stores hash keys and hash values which are generated by using the modulating spectrum peak point fingerprints provided by the audio fingerprint generator 110.

A hash key and hash value generator 121 generates hash keys which indicate respective address values of the hash table and hash values which are stored on the hash table via at least one hash function by using the modulating spectrum peak point audio fingerprints generated in the modulating spectrum peak point audio fingerprint generator 110.

The modulating spectrum peak point audio fingerprint information storage 130 stores hash keys and hash values which correspond to the hash keys generated by using each of the modulating spectrum peak point audio fingerprints in the hash key and hash value generator 121 on the hash table 131.

A hash searching method in the audio data searcher 120, according to an exemplary embodiment, stores audio data in an arrangement which is provided as a hash table for quick searching audio data, converts the modulating spectrum peak point audio fingerprints of the audio query clips into hash keys which indicate addresses of the hash table via proper hash functions, and searches hash values on the same position as the hash keys of the query clips within the hash table 131.

The hash searching method, according to an exemplary embodiment, has advantages in that searching time is regular irrespective of the hash table size, searching speed is significantly faster than related searching methods such as binary searching, and inserting and deleting data can be performed easily.

The hash functions, according to an exemplary embodiment, are used when the modulating spectrum peak point audio fingerprints are converted into hash keys and hash values. These functions convert data from a class of the modulating spectrum peak point audio fingerprints into hash keys which indicate address values of the hash table and hash values which are stored on the hash table.

Further, the hash functions, according to an exemplary embodiment, become multi-to-one corresponding functions, because a potential number of available combinations of the modulating spectrum peak point audio fingerprints is much greater than a corresponding size of the hash table. In addition, the hash functions, according to an exemplary embodiment, should be fast and simple with respect to performing calculations.

An audio searching method, according to an exemplary embodiment, generates modulating spectrum peak point fingerprints of the audio query clips from the modulating spectrum peak point audio fingerprint generator 110 when audio query clips are inputted, and generates hash keys from the modulating spectrum peak point audio fingerprints of the audio query clips via the hash key and hash value generator 121. The modulating spectrum peak point audio fingerprint searcher 140 obtains hash values which are stored on the same position as hash keys of the audio query clips on the hash table, converts the result into modulating spectrum peak point audio fingerprint information, determines final searching results, and provides the searching results to a user.

The modulating spectrum peak point audio fingerprint searcher 140 includes a hash key comparing searcher and hash value obtainer 141, an audio information converter 142 of the obtained hash values, and a final searching result determiner 143.

The hash key comparing searcher and hash value obtainer 141 obtains hash values which are stored on the hash table by searching the hash table having the same address as hash key which is calculated by the hash key and hash value generator 121 from the modulating spectrum peak point audio fingerprints of the audio query clips.

The audio information converter 142 of the obtained hash values converts the hash values obtained via the hash key comparing searcher and hash value obtainer 141 into audio indexing information, such as a music song identification (ID) or an audio event ID, via one or more hash functions.

The final searching result determiner 143 calculates the most frequent audio indexing information (e.g., a music song ID or an audio event ID) from the audio information converter 142 of the obtained hash values, and determines data which corresponds to a largest amount of audio indexing information as the final searching audio information.

The information provider 150 provides information which relates to audio data which are searched in the modulating spectrum peak point audio fingerprint searcher 140 to a user.

Thereby, the music information searching apparatus, according to an exemplary embodiment, extracts positions of modulating spectrum peak points which are relatively strong with respect to noise and/or echo environments from modulating spectrums of audio signals and audio data, generates modulating spectrum peak point audio fingerprints by combining the extracted positions of peak points, calculates hash keys which indicate address values of the hash table and hash values stored on the hash table from the modulating spectrum peak point audio fingerprints by using one or more hash functions, and stores the result on the hash table.

Further, the music information searching apparatus, according to an exemplary embodiment, extracts modulating spectrum peak point audio fingerprints based on distinguished peak points of the modulating spectrums from the audio query clips, calculates hash keys of the audio query clips by using the one or more hash functions, obtains hash values which correspond to hash keys of the above query music file from the hash table of the modulating spectrum peak point audio fingerprint information storage 130, and converts the result into audio indexing information via the one or more hash functions. Thus, music information can be searched with high speed.

FIGS. 3A, 3B, 4A, and 4B are views which illustrate a service providing method, according to an exemplary embodiment.

A service which is illustrated in FIGS. 3A and 3B may be provided by using the music information searching apparatus illustrated in FIGS. 1 and 2.

For example, when an advertisement (AD) on television (TV) 10 that is being viewed displays a particular item (e.g., an "Ad catch") indicating that the service according to an exemplary embodiment can be provided at 310, a user command to record corresponding AD music may be inputted at 320. When a motion which corresponds to shaking a user terminal 20 is inputted, corresponding AD music is recorded via the user terminal 20, the recorded audio is transmitted to a data server (not illustrated), and the corresponding AD may be recognized via searching.

Figure 4A:
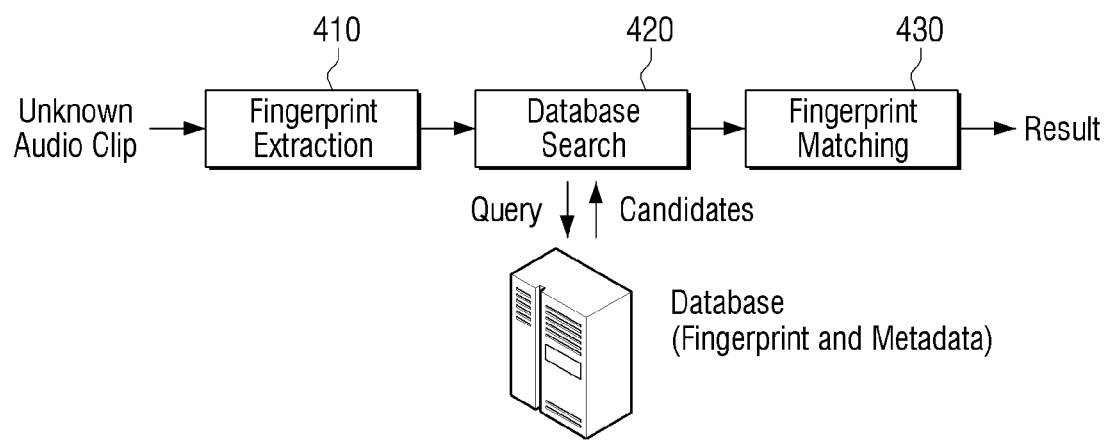

In particular, referring to FIG. 4A, audio fingerprints which relate to the recorded AD music via the user terminal 20 are extracted at 410, a database which stores audio fingerprints of each AD is searched at 420, and information which corresponds to the extracted audio fingerprints (e.g., an AD title and ID) may be searched at 430. For example, a database such as that illustrated in FIG. 4B can be used; the database has a structure in which audio fingerprints of AD music are extracted, indexed, and stored.

Referring again to FIGS. 3A and 3B, at 330, additional service information (e.g., additional information and coupon service) of the recognized AD may be provided to the user terminal 20. For example, when it is recognized that the AD refers to a specific automobile product, additional service information of corresponding AD may be provided to the user terminal 20. Such additional service may be also stored on the data server (not illustrated) described above, and/or stored on an external server (e.g., corresponding product seller server). When corresponding additional service information is stored on the data server (not illustrated), this information may be updated regularly with information which is received from a corresponding product-related server.

When a user command to select a specific item on the additional service provided to the user terminal 20 is inputted at 340, detailed information which corresponds to the selected item may be provided at 350. For example, when an item relating to "demonstrating ride available shops" is selected on the automobile product AD, detailed information which relates to demonstrating ride available shops may be provided.

The services described above may be applied to a music information searching method, according to an exemplary embodiment.

FIG. 5 is a flowchart which illustrates a music information searching method, according to an exemplary embodiment.

According to the music information searching method illustrated in FIG. 5, in operation S510, modulating spectrums which are relatively strong with respect to noise and/or echo environments are extracted from audio data.

In operation S520, modulating spectrum peak point audio fingerprints are generated from the extracted modulating spectrums by using position information between preset peak points.

In operation S530, the generated modulating spectrum peak point audio fingerprints are converted into hash keys which indicate addresses of the hash table and hash values which are stored on the hash table via one or more hash functions.

In operation S540, hash keys of the modulating spectrum peak point audio fingerprints which relate to the audio query clips are extracted, and music information is searched by comparing the extracted hash keys of the audio query clips with addresses of the hash table.

FIG. 6 is a flowchart which illustrates a music information searching method, according to an exemplary embodiment.

According to the music information searching method illustrated in FIG. 6, in operation S610, the audio information searching apparatus extracts peak points of modulating spectrums which are relatively strong with respect to noise and/or echo environments.

In operation S615, the audio information searching apparatus generates modulating spectrum peak point audio fingerprints by using information which relates to positions between the modulating spectrum peak points which are relatively strong with respect to noise and/or eco environments from the extracted modulating spectrums.

In operation S620, hash keys and hash values which indicate address values are generated by using one or more hash functions with respect to the generated audio fingerprints.

In operation S625, the hash table is generated by using the determined hash keys and hash values.

Thereby, the music information searching method, according to an exemplary embodiment, extracts distinguished peak points of modulating spectrums which are relatively strong with respect to noise and/or echo environments from the modulating spectrums. Position information which relates to such distinguished modulating spectrum peak points is uniformly extractable in both a noiseless clear environment and a quite noisy environment, and thus, shows features that are extremely strong with respect to noise and/or echo environments.

In operation S630, the audio information searching apparatus extracts modulating spectrum peak points which are relatively strong with respect to noise and/or echo relating to the audio query clips.

In operation S635, modulating spectrum peak point audio fingerprints are generated by using position information which relates to the distinguished peak points with respect to the extracted modulating spectrums from the audio query clips.

In operation S640, hash keys are calculated by using one or more hash functions with respect to the generated modulating spectrum peak point audio fingerprints of the audio query clips.

In operation S645, address values which match with the calculated hash keys that indicate address values of the audio query clips are searched from the hash table.

In operation S650, all of the hash values of the searched addresses from the hash table are obtained, and the obtained hash values are converted and obtained to be audio indexing information by using one or more hash functions.

In operation S655, a maximum amount of audio indexing information is determined to be final searching audio information from the obtained audio indexing information.

Further, the music information searching method according to the various exemplary embodiments may be implemented as program codes that can run on a computer and may be provided to the audio information searching apparatus so as to be implemented by a processor while being stored in any one or more of various types of non-transitory computer readable recording medium.

A non-transitory computer readable recording medium indicates a medium which store data semi-permanently and can be read by devices, by contrast with a medium which stores data temporarily such as register, cache, or memory. In particular, the above various applications or programs may be stored and provided in any type of non-transitory computer readable recording medium, such as, for example, a compact disk (CD), a digital versatile disk (DVD), a hard disk, a Blu-ray disk, a universal serial bus (USB) device, a memory card, or read-only memory (ROM).

Further, the foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:

1. A music information searching method, comprising:
obtaining modulating spectrums from audio data;
deleting unnecessary areas that do not indicate unique features of audio signals from the modulating spectrums by normalizing the modulating spectrums;
obtaining position information of peak points from the normalized modulating spectrums and generating audio fingerprints of the peak points based on the position information;
converting the audio fingerprints into hash keys which indicate addresses of hash tables and hash values that are stored on the hash tables using at least one hash function; and
obtaining hash keys related to audio query clips and searching music information by comparing the obtained hash keys with the addresses of the hash tables,
wherein the normalizing the modulating spectrums comprises at least one normalizing method from among a Zero-Mean normalization, a Cepstral Mean normalization, a Decibel-scale normalization, a normalization by using average values, a normalization by using medium values, and a Quantile normalization.

2. A music information searching method, comprising:
obtaining modulating spectrums from audio data;
deleting unnecessary areas that do not indicate unique features of audio signals from the modulating spectrums by normalizing the modulating spectrums;
obtaining position information of peak points from the normalized modulating spectrums and distinguishing position information which relates to first modulating spectrum peak points which are weaker than a first threshold with respect to noisy environments from second modulating spectrum peak points which are stronger than the first threshold with respect to the noisy environments, and obtaining the second modulating spectrum peak points;
converting position information which relates to the second modulating spectrum peak points into modulating spectrum peak point audio fingerprints;
converting, by using at least one hash function, identification numbers which are respectively allocated to the modulating spectrum peak point audio fingerprints and music songs into hash keys that indicate addresses of hash tables and hash values that are stored on the hash tables, and storing a result of the converting on the hash tables;
obtaining modulating spectrums from audio query clips;
deleting unnecessary areas that do not indicate unique features of audio query signals from the audio query modulating spectrums by normalizing the audio query modulating spectrums;
distinguishing position information which relates to first audio query modulating spectrum peak points which are weaker than a second threshold with respect to the noisy environments from second audio query modulating spectrum peak points which are stronger than the second threshold with respect to the noisy environments from among the normalized audio query modulating spectrums, and obtaining the second audio query modulating spectrum peak points;
converting position information which relates to the second audio query modulating spectrum peak points into audio fingerprints which relate to the second audio query modulating spectrum peak points;

obtaining position information which relates to the second audio query modulating spectrum peak points from among the normalized modulating spectrums of audio query clips;

converting position information which relates to the second modulating spectrum peak points into modulating spectrum peak point audio fingerprints;

obtaining hash values of hash tables which respectively correspond to the addresses by calculating, by using at least one hash function, hash keys from the modulating spectrum peak point audio fingerprints of audio query clips; and determining final searching results by obtaining audio indexing information from the obtained hash values, wherein the normalizing the modulating spectrums comprises at least one normalizing method from among a Zero-Mean normalization, a Cepstral Mean normalization, a Decibel-scale normalization, a normalization by using average values, a normalization by using medium values, and a Quantile normalization.

3. The music information searching method of claim 2, wherein the obtaining the modulating spectrums from the audio data comprises extracting spectrum coefficients of the audio data by performing a fast Fourier transform (FFT), and converting the extracted spectrum coefficients into modulating spectrums via at least one modulating function.

4. The music information searching method of claim 2, wherein the obtaining the modulating spectrum peak points comprises using at least one from among a finite impulse response filter, an infinite impulse response filter, a Kalman filter, a spectrum deduction, a method for calculating minimum components of modulating spectrums and calculating modulating spectrum peak points by using the calculated minimum components, a method for extracting distinguished peak points from noise components by using adaptive threshold values which are calculable by using a highest peak point of the modulating spectrums, and a method for deleting noises by using a zero crossing rate and energy.

5. The music information searching method of claim 2, wherein the converting the position information which relates to the second audio query modulating spectrum peak points into the audio fingerprints comprises obtaining position information which exists within preset intervals between the distinguished second modulating spectrum peak points by using values which indicate positions of the second modulating spectrum peak points as modulating spectrum peak point audio fingerprints.

6. The music information searching method of claim 2, wherein the storing on the hash tables comprises:
calculating hash keys which indicate respective addresses of the hash tables and hash values which relate to the hash tables by using information which relates to the generated modulating spectrum peak point audio fingerprints via at least one hash function; and
generating the hash tables by storing the modulating spectrum peak point audio fingerprints on the hash tables based on the calculated hash keys and hash values.

7. The music information searching method of claim 2, wherein the obtaining the modulating spectrums from the audio query clips comprises:
extracting spectrum coefficients by performing a respective FFT of each of the audio data and the audio query clip data; and
converting the extracted spectrum coefficients into the modulating spectrums via at least one modulating function.

8. The music information searching method of claim 2, wherein the obtaining the position information which relates to the second audio query modulating spectrum peak points from among the normalized modulating spectrums of audio query clips comprises using at least one from among a finite impulse response filter, an infinite impulse response filter, a Kalman filter, a spectrum deduction, a method for calculating minimum components of modulating spectrums and calculating modulating spectrum peak points by using the calculated minimum components, a method for extracting distinguished peak points from noise components by using adaptive threshold values which are calculable by using a highest peak point of the modulating spectrums, and a method for deleting noises by using a zero crossing rate and energy.

9. The music information searching method of claim 2, wherein the converting into the modulating spectrum peak point audio fingerprints comprises obtaining position information which relates to two points by using values which indicate positions of the modulating spectrum peak points as modulating spectrum peak point audio fingerprints.

10. The music information searching method of claim 2, wherein the obtaining the hash values of the hash tables comprises:
obtaining hash keys which indicate respective addresses of the hash tables by using information which relates to the generated modulating spectrum peak point audio fingerprints of audio query clips via at least one hash function; and
obtaining the hash values by using the obtained hash keys.

11. The music information searching method of claim 2, wherein the determining the final searching results comprises:
converting the hash values into audio indexing information by using the at least one hash function; and
determining a maximum amount of audio indexing information as final searching audio information from among the obtained audio indexing information.

12. An audio information searching method, comprising:
obtaining modulating spectrums from audio data;
deleting unnecessary areas that do not indicate unique features of audio signals from the modulating spectrums by normalizing the modulating spectrums;
obtaining position information of peak points from the normalized modulating spectrums and generating audio fingerprints of the peak points based on the position information;
comparing information relating to the generated audio fingerprints with information relating to at least one user-selected audio query; and
determining a search result based on a result of the comparing,
wherein the normalizing the modulating spectrums comprises at least one normalizing method from among a Zero-Mean normalization, a Cepstral Mean normalization, a Decibel-scale normalization, a normalization by using average values, a normalization by using medium values, and a Quantile normalization.

13. The audio information searching method of claim 12, further comprising:
applying at least one hash function to the generated audio fingerprints in order to obtain the information relating to the generated audio fingerprints, and
applying the at least one hash function to the at least one user-selected audio query in order to obtain the information relating to the at least one user-selected audio query.

14. The audio information searching method of claim 12, wherein the information relating to at least one user-selected audio query is stored in a database, and the comparing comprises comparing the information relating to the generated audio fingerprints with information which is stored in the database.

15. A non-transitory computer-readable storage medium storing a program which is executable by a computer for performing the method of claim 12.

16. An apparatus for performing an audio information search, comprising:
- an extractor which is configured to obtain modulating spectrums from audio data;
- a normalizer which is configured to delete unnecessary areas that do not indicate unique features of audio signals from the modulating spectrums by normalizing the modulating spectrums;
- an audio fingerprint generator which is configured to obtain position information of peak points from the normalized modulating spectrums and to generate audio fingerprints of the peak points based on the position information; and
- an audio data searcher which is configured to compare information relating to the generated audio fingerprints with information relating to at least one user-selected audio query, and to determine a search result based on a result of the comparing, wherein the normalizer is further configured to normalize the modulating spectrums by at least one normalizing method from among a Zero-Mean normalization, a Cepstral Mean normalization, a Decibel-scale normalization, a normalization by using average values, a normalization by using medium values, and a Quantile normalization.

17. The apparatus of claim 16, wherein the audio data searcher includes a hash value generator which is configured to:
- apply at least one hash function to the generated audio fingerprints in order to obtain the information relating to the generated audio fingerprints, and
- apply the at least one hash function to the at least one user-selected audio query in order to obtain the information relating to the at least one user-selected audio query.

18. The apparatus of claim 16, wherein the information relating to at least one user-selected audio query is stored in a database, and wherein the audio data searcher is further configured to compare the information relating to the generated audio fingerprints with information which is stored in the database.

* * * * *